(12) United States Patent
Pulsipher (10) Patent No.: US 7,548,895 B2
(45) Date of Patent: Jun. 16, 2009

(54) COMMUNICATION-PROMPTED USER ASSISTANCE

(75) Inventor: Jon D. Pulsipher, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 11/428,086

(22) Filed: Jun. 30, 2006

(65) Prior Publication Data

US 2008/0005053 A1   Jan. 3, 2008

(51) Int. Cl.
*G06N 5/00* (2006.01)
(52) U.S. Cl. .......................... 706/45; 706/47
(58) Field of Classification Search .............. 706/45, 706/47
See application file for complete search history.

(56) References Cited

U.S. PATENT DOCUMENTS

| | | | |
|---|---|---|---|
| 6,021,403 A * | 2/2000 | Horvitz et al. | 706/45 |
| 6,144,938 A | 11/2000 | Surace et al. | |
| 6,529,863 B1 | 3/2003 | Ball et al. | |
| 6,598,022 B2 * | 7/2003 | Yuschik | 704/275 |
| 6,977,993 B2 | 12/2005 | Starbuck et al. | |
| 7,007,085 B1 | 2/2006 | Malik | |
| 7,249,117 B2 * | 7/2007 | Estes | 706/52 |
| 7,249,124 B2 * | 7/2007 | Sasaki et al. | 707/3 |
| 2002/0023957 A1 | 2/2002 | Michaelis | |
| 2004/0205182 A1 * | 10/2004 | Geddes | 709/223 |
| 2005/0010823 A1 * | 1/2005 | Kelley et al. | 713/202 |
| 2005/0201533 A1 | 9/2005 | Eman et al. | |
| 2006/0080107 A1 | 4/2006 | Hill et al. | |

FOREIGN PATENT DOCUMENTS

GB   2387930   10/2003

OTHER PUBLICATIONS

Human Activity Recognition Project Downloaded from http://www.intel.com/research/print/overview_human_activity_recognition.pdf.
Kuansan Wong, Salt: A Spoken Language Interface for Web-Based Multimodal Dialog Systems Downloaded from http://research.microsoft.com/srg/papers/2002-kuansan-icslp.pdf.
David Williams, et al., 'The Sound of Silence': A Preliminary Experiment Investigating Non-Verbal Auditory Representations in Telephone-Based Automated Spoken Dialogues 1 Downloaded from http://www.icad.org/websiteV2.0/Conferences/ICAD98/papers/WILLIAMS/WILLIAMS.PDF.

\* cited by examiner

*Primary Examiner*—Wilbert L Starks, Jr.
(74) *Attorney, Agent, or Firm*—Woodcock Washburn LLP (57) ABSTRACT

Communications are monitored for user intentions related to user tasks such as meeting scheduling and the like 308. When an intention (e.g. mention of a meeting) is determined from the communications, candidate task actions (e.g., scheduling meeting) are initiated and/or stored 310. At an appropriate event trigger (e.g. completion of communications), a user can be prompted with a list of candidate task actions and can select which actions to perform 312. Action profiles 320 can also be incorporated to allow customization of how task actions are completed. These profiles can be called at the time of task action execution to guide the action fulfillment. The profiles can be user and/or system generated and/or provided by third parties and the like. The task actions are typically performed utilizing task related applications to fully execute the task action so that additional user input is not required.

36 Claims, 7 Drawing Sheets

COMMUNICATION-PROMPTED USER ASSISTANCE

BACKGROUND

With the introduction of mobile communication devices, people have become quite accustomed to communicating with others at any place and time. Thus, a user can discuss activities that are scheduled for a future time but not be in a position to take note of the activity or its date. For example, an employee can be on their way to work when they receive an important call on their mobile phone from their boss. The boss can inform them that there are several meetings today and during the week. The employee agrees to support these meetings, but due to a desire not to keep their boss online too long, they do not inform him that they need to stop, find a pen and paper and write down the times and dates of the meetings.

Instead, the employee attempts to memorize the meeting schedules and write them down when they arrive at the office. Depending on the number of meetings and dates, this can likely lead to a forgotten meeting and associated ramifications. In other scenarios, people are often pre-occupied with other interests while communicating and do not even realize that they have agreed to perform a task. For example, a teenager, while listening to music, attempts to hold a conversation with their parent and agrees to take out the garbage and clean up their room. This part of the conversation is typically quickly forgotten unless reminded by the parent after the fact. Thus, often, especially in casual conversations, people forget or remember incorrectly tasks that they have mentioned or agreed to do. The ramifications of forgetting these tasks can range from a minor inconvenience (teenager yelled at by their parents) to a major impact (employee forgets client meeting and loses large client for business).

SUMMARY

Communications are monitored for user intentions related to user tasks. When an intention is determined from the communications, candidate task actions are initiated and/or stored. A user can also be cued that a candidate task action has occurred. At an appropriate event trigger, a user can be prompted with a list of candidate task actions and can select which actions to perform. Other instances can automatically perform candidate task actions without user intervention. Action profiles can also be incorporated to allow customization of how task actions are performed. These profiles can be called at the time of task action execution to guide the action fulfillment. The profiles can be user and/or system generated and/or provided by third parties and the like. The task actions typically employ task related applications to fully execute the task action so that additional user input is not required. In other instances, communications details are attached to an executed task as a reminder to a user why the task was performed.

The above represents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Communication devices that allow extreme mobility are becoming very commonplace. While this allows for complete freedom of movement for users, it can also encumber the user's ability to adequately take notes during the communications. Tasks that are mentioned during communications are soon forgotten or incorrectly remembered. For example, a business person can call a client and discuss meeting dates, purchases, and information requests (i.e., tasks) during the call. However, if the business person is not able to take notes during the call, they might not fully remember all of the tasks discussed. Instances provided herein monitor communications to dynamically recognize intentions of a user related to tasks mentioned in communications. By utilizing intentions related to a task, an instance can provide a candidate task action list for tasks in which the user desires to participate. In some instances, a determination can be made during the communications as to whether a user wants to participate in a task. This information can then be used to automatically exclude that task from the candidate task action list.

Figure 1:
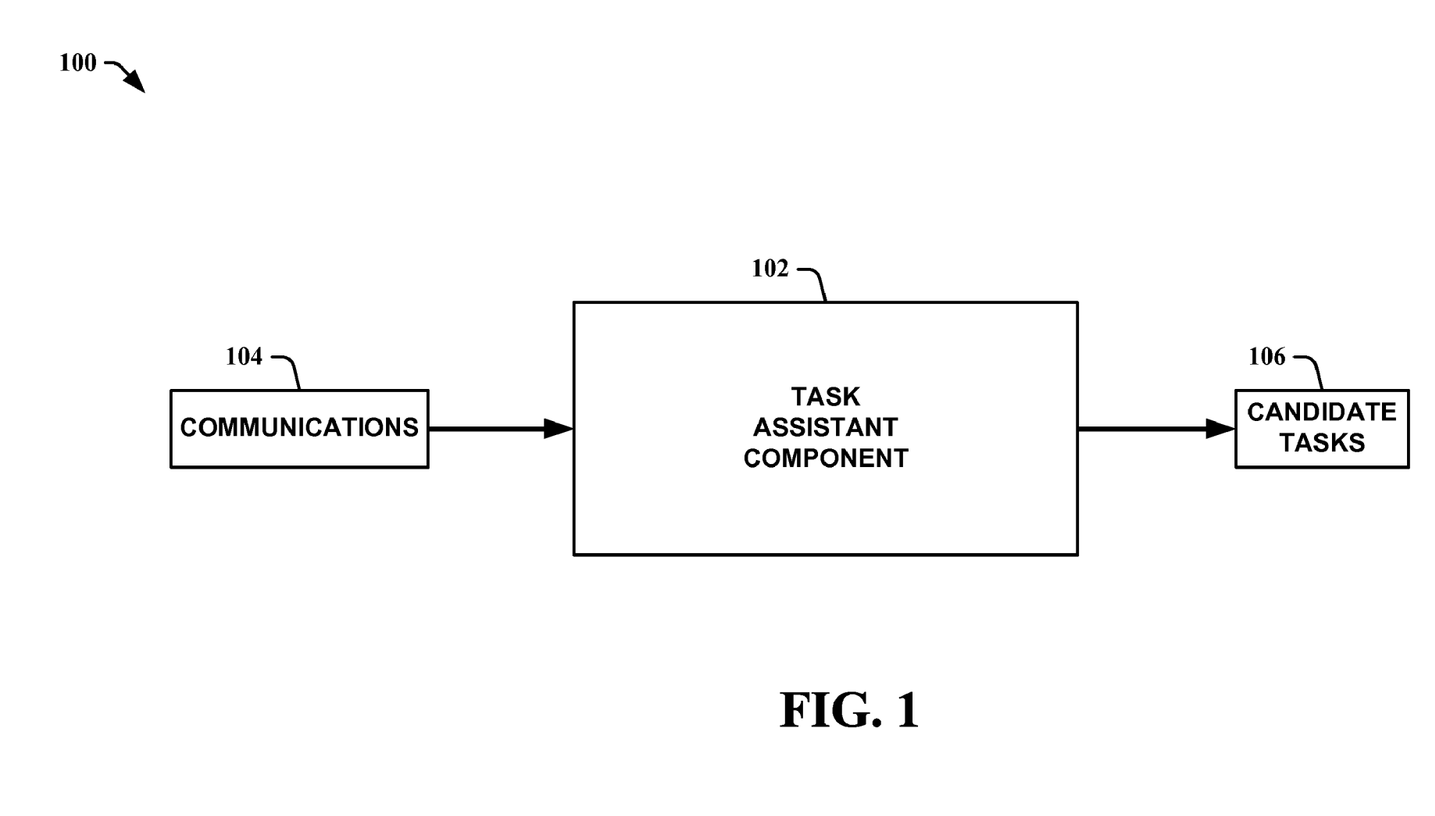
FIG. 1 is a block diagram of a task recognition system for communications in accordance with an aspect of an embodiment.

In FIG. 1, a block diagram of a task recognition system 100 for communications in accordance with an aspect of an embodiment is shown. The task recognition system 100 is comprised of a task assistant component 102 that receives communications 104 and provides candidate tasks 106. The communications 104 can include, but are not limited to, voice communications and/or written communications and the like such as, for example, emailing, instant messaging, text messaging, telephone calls, etc. The task assistant component 102 can be adapted to perform various types of recognition based on the type of communications 104. The task assistant component 102 can employ artificial intelligence mechanisms to facilitate task recognition as well. The task assistant component 102 monitors the communications 104 dynamically to extract a user's intent with regard to a task mentioned in the communications 104. For this type of processing, natural language techniques can be utilized to facilitate in interpreting the user's intent.

Recognizing tasks alone in the communications 104 does not necessarily yield the true intentions of a user. It is possible that a user can say, "please schedule a meeting at 10 am today," and another user can reply, "no, I will not do that." In that case, the intent of the second user is not to schedule a meeting (the task). By incorporating task intent into the dynamic monitoring, the task assistant component 102 can more accurately accumulate desirable candidate tasks 106. These candidate tasks 106 can then be presented to a user as a reminder of mentioned tasks during the communications 104. The user then can have the option of dismissing the task prompts and/or selecting which tasks can be executed.

Instances of the task recognition system 100 can reside on a communication device and/or reside in disparate locations from the communication device in distributed implementations. Considerations for the location of components of a distributed system can include, but are not limited to, available processing power (e.g., a cell phone might not have enough processing power to perform natural language processing), communication device independent operation (e.g., monitoring performed as a service at a wireless cell provider rather than on a particular cell phone-avoiding device unique applications, etc.), and/or communication device functionality limitations (e.g., a dumb communication terminal without any significant processing capabilities and/or not supportable with applications) and the like. This type of flexibility allows easy introduction of the task recognition system 100 into existing communication systems. By offering it to users as a service first, users can become accustomed to its use without buying new communication devices and/or downloading additional applications and the like. As newer and better communication devices evolve, more and more related components could be moved to individual communication devices.

It can also be appreciated that users can exploit instances provided herein to involve other parties not privy to the original communications. For example, a traveling salesperson can take orders, promise product support, and/or offer to provide additional information while communicating with a customer. Tasks associated with ordering can be forwarded to an order processing department at the salesperson's headquarters so that it can be fulfilled quickly, tasks associated with product support can be forwarded to a technical support team so they can contact the customer immediately, and/or tasks associated with supplying additional product information can be forwarded to the salesperson's personal assistant at headquarters so that it can be mailed out immediately. This substantially increases the efficiency of the user (salesperson) and drastically reduces subsequent errors in remembering and/or relaying the information to the appropriate recipient. The salesperson can also choose to review candidate tasks 106 before they are forwarded to eliminate any undesired tasks.

The candidate tasks 106 can also be utilized to fully perform a desired task selected by a user. These instances, discussed in detail infra, allow execution and/or guidance of the task rather than just calling up an application and then requiring the user to enter the information. Additional information can also be incorporated with the executed task to allow a user to quickly ascertain why a task was performed. For example, a hyperlink can be provided in a calendar entry that brings up the date and time and who the call was placed with for that particular meeting scheduling. This eliminates unnecessary guessing as to the origination of, for example, a meeting request. Thus, the task recognition system 100 can be employed to substantially reduce the amount of time and effort in fulfilling tasks mentioned during communications while substantially reducing errors as well by reducing reliance on a user's memory of events.

Figure 2:
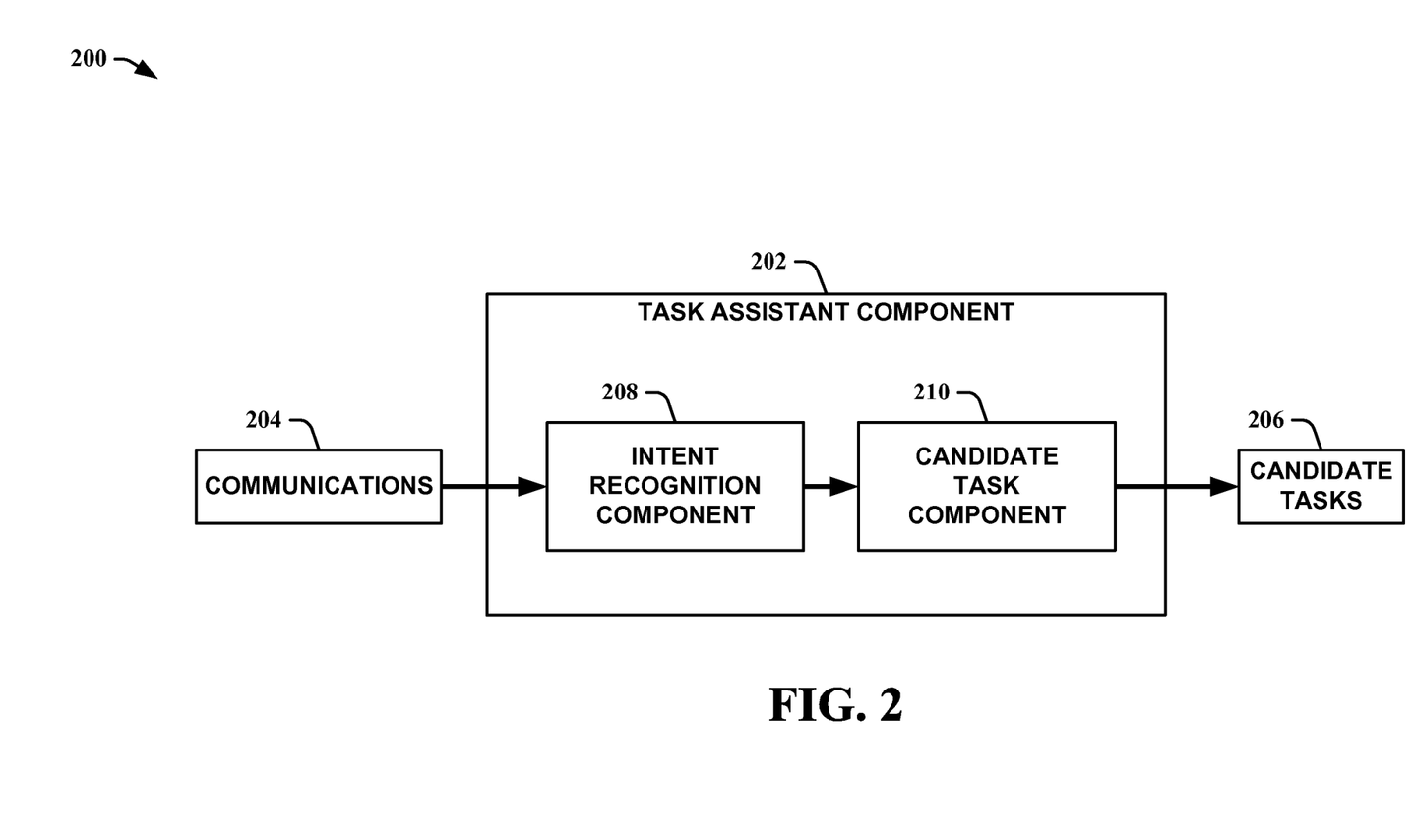
FIG. 2 is another block diagram of a task recognition system for communications in accordance with an aspect of an embodiment.

Turning to FIG. 2, another block diagram of a task recognition system 200 for communications in accordance with an aspect of an embodiment is depicted. The task recognition system 200 is comprised of task assistant component 202 that receives communications 204 and provides candidate tasks 206. The task assistant component 202 is comprised of an intent recognition component 208 and a candidate task component 210. The communications 204 can include, but are not limited to, voice communications and/or written communications and the like such as, for example, emailing, instant messaging, text messaging, telephone calls, etc. The intent recognition component 208 receives the communications 204 and dynamically monitors the communications 204 for an apparent intent related to a task.

The recognition of the task intent can be assisted with artificial intelligence techniques such as, for example, natural language processing techniques and the like. The intent recognition component 208 determines if a task has been referred to and the intent, if any, regarding accomplishment of the task. The intent is generally construed for a user who employs the task recognition system 200, but the intent recognition component 208 can also be utilized to determine intent for one or multiple parties in the communications 204. Thus, the task recognition system 200 can be utilized to provide candidate tasks 206 to multiple users based on their individual intents and/or tasks.

As an example, the intent recognition component 208 can dynamically recognize a phrase such as "schedule a meeting on Wednesday" and can determine, for example, if user A is the party that will do the scheduling (e.g. user A states "yes, I'll schedule that"). Thus, user A can be presented with a candidate task for scheduling the meeting. The intent recognition component 208 can also employ contextual and/or environmental information to assist in assessing tasks and/or intent. For example, time-of-day can be utilized to determine when a user intends to do a task. Thus, if the time is 11 am and the user refers to completing the task "by 10," they are most likely referring to 10 pm and not 10 am. Similarly, environmental information such as whether the user is on the phone, on the computer, in the office or in a car, etc., can be utilized to facilitate determination of the intention of the user associated with a task. This substantially increases the accuracy of the intent recognition component 208.

Although the intent recognition component 208 is illustrated within the task assistant component 202, other instances can employ external and/or pre-existing recognition components as well. This increases the flexibility of the task recognition system 200 and allows for easy integration into existing communication devices and/or systems and the like. The intent recognition component 208 can employ simplistic recognizers such as, for example, key phrase recognizers (e.g., using key phrase catalogs, etc.) in text and/or voice communications and the like and/or sophisticated artificial intelligence recognizers. This allows the task assistant system 200 to be scaled appropriately based on available resources. For example, a PDA device might have very limited resources and, therefore, a resource efficient recognizer can be employed by the intent recognition component 208. If the intent recognition component 208 is located with abundant resources, a substantially more powerful recognizer can be utilized (e.g., the intent recognition component 208 is located at a communication service provider such as a wireless provider with substantially unlimited processing power that provides the recognition function to an end user, etc.).

The candidate task component 210 receives the task intent from the intent recognition component 208 and associates it with a task. Thus, for example, if the intent recognition component 208 determined that a user intends to schedule a meeting, the candidate task component 210 determines what task and/or tasks need to be performed to accomplish it. The tasks for scheduling a meeting can include opening up a calendar and inserting meeting titles, parties to the meeting, times of the meeting, and/or adding additional information such as, for example, a link to why the meeting was input into the calendar, etc. It can also include a task to remind the user of the meeting and/or a task to follow-up with another party to obtain additional information such as their contact information to allow completion of the meeting scheduling. Another task can include notification of others that a meeting is to take place. Thus, the candidate task component 210 determines what tasks are associated with the user's intent and provides them as the candidate tasks 206. The candidate tasks 206 can contain, for example, one or multiple task suggestions that the user can either accept or reject after a follow-up prompting.

Figure 3:
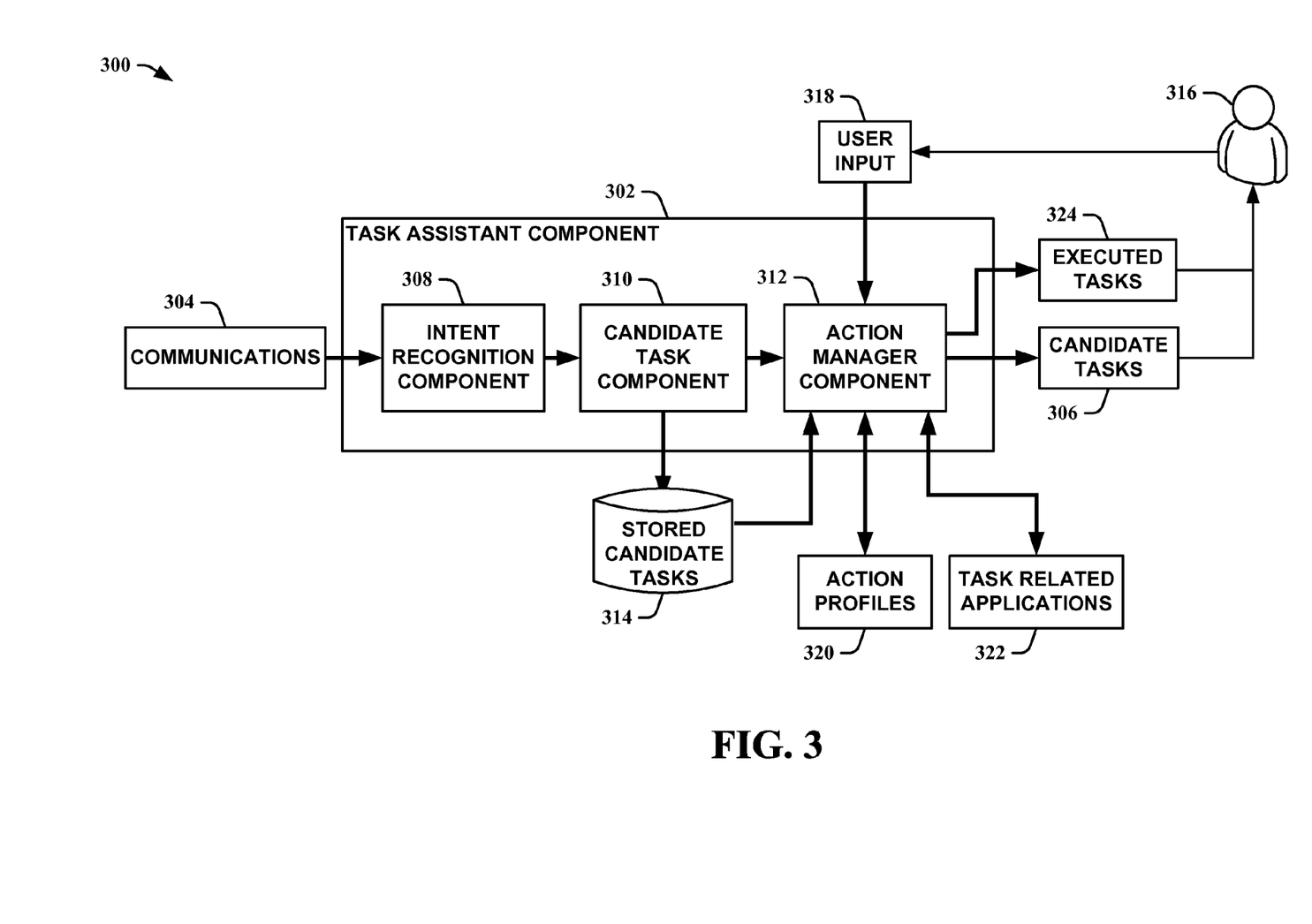
FIG. 3 is yet another block diagram of a task recognition system for communications in accordance with an aspect of an embodiment.

Looking at FIG. 3, yet another block diagram of a task recognition system 300 for communications in accordance with an aspect of an embodiment is illustrated. The task recognition system 300 is comprised of task assistant component 302 that receives communications 304 and provides candidate tasks 306. The task assistant component 302 is comprised of an intent recognition component 308, a candidate task component 310, and an action manager component 312. The communications 304 can include, but are not limited to, voice communications and/or written communications and the like such as, for example, emailing, instant messaging, text messaging, telephone calls, etc. The intent recognition component 308 receives the communications 304 and dynamically monitors the communications 304 for an apparent intent related to a task. The candidate task component 310 receives the task intent from the intent recognition component 308 and associates it with a task to form stored candidate tasks 314. The stored candidate tasks 314 can be stored externally if desired.

The action manager component 312 receives candidate tasks 306 directly from the candidate task component 310 and/or indirectly from the candidate task component 310 via the stored candidate tasks 314. The action manager component 312 utilizes an event trigger to determine when to prompt a user 316 with candidate tasks 306. The event trigger can include, but is not limited to, the completion of the communications 304 and the like. Thus, for example, when a phone call ends, the action manager component 312 can prompt the user 316 with the candidate tasks 306 that were determined during the communications 304. The user 316 can then provide user input 318 to the action manager component 312 regarding whether to complete any of the candidate tasks 306. The user input 318 can also include additional information on how and/or when to complete a task and the like. In some instances, the action manager component 312 can act as a guide (e.g., as if it is a real life assistant sitting next to a user) and query the user 316 as to how to proceed and/or to supply missing/additional information that can be required to fulfill a task.

The action manager component 312 receives the user input 318 and acts upon any desired tasks. To accomplish this, the action manager component 312 can employ action profiles 320. The action profiles 320 represent, for example, templates on how to accomplish various tasks. The action profiles 320 can be provided by users, systems, and/or third parties and, thus, allow for additional flexibility and control over task completion. For example, the action profiles 320 can contain an address book profile that indicates how contact information is to be stored in a user's address book (e.g., which software program to use, formatting of the name information—last name first, etc., font size, color, etc.). The action manager component 312 then carries out a task utilizing an appropriate program from task related applications 322 based on an action profile if provided. This interaction with the user 316, allows the user 316 to maintain control over what, how and/or when the tasks are accomplished.

In another instance, the action manager component 312 can prompt the user 316 that an intent and/or candidate task has been detected during the communications 304. Thus, the action manager component 312 can receive direct input from the intent recognition component 308 regarding intent if necessary. This can enable the user 316 to monitor the progress of the task recognition system 300 dynamically. The user 316 could select and/or delete the intents and/or candidate tasks in substantially real time as well.

It can be appreciated that although the components 308-312 of the task assistant component 302 are illustrated in a co-located manner, they can also be remotely located and communicate via a variety of communication means. Thus, each component 308-312 can reside in a location that best supports its resource requirements and/or user interfaces and the like. Traditionally, complex recognition algorithms have required powerful processing resources. Thus, the intent recognition component 308 can be located at a service provider and/or on a desk top computing device and the like while the candidate task component 310 and/or the action manager component 312 can reside on, for example, a mobile device and the like. Likewise, the stored candidate tasks 314 can be stored locally and/or remotely to facilitate processing of the tasks. Communications means can include, but are not limited to, global communication systems such as the Internet, intranet systems, wireless systems, wired systems (e.g., landlines), fiber-optic systems, and/or satellite-based systems and the like.

Because of the substantial flexibility of the task recognition system 300, it can be completely performed by service providers at their facilities, partially performed at their facilities, and/or totally performed on a communication device and the like. Revenue based schemes can be employed at any point to allow income based on individual portions of the task recognition system 300. For example, charges can occur for completed tasks, for providing candidate task lists, and/or for just recognizing intent in the communications 304 and the like. This can allow a service provider to provide various levels of capabilities for their users and charge accordingly.

Figure 4:
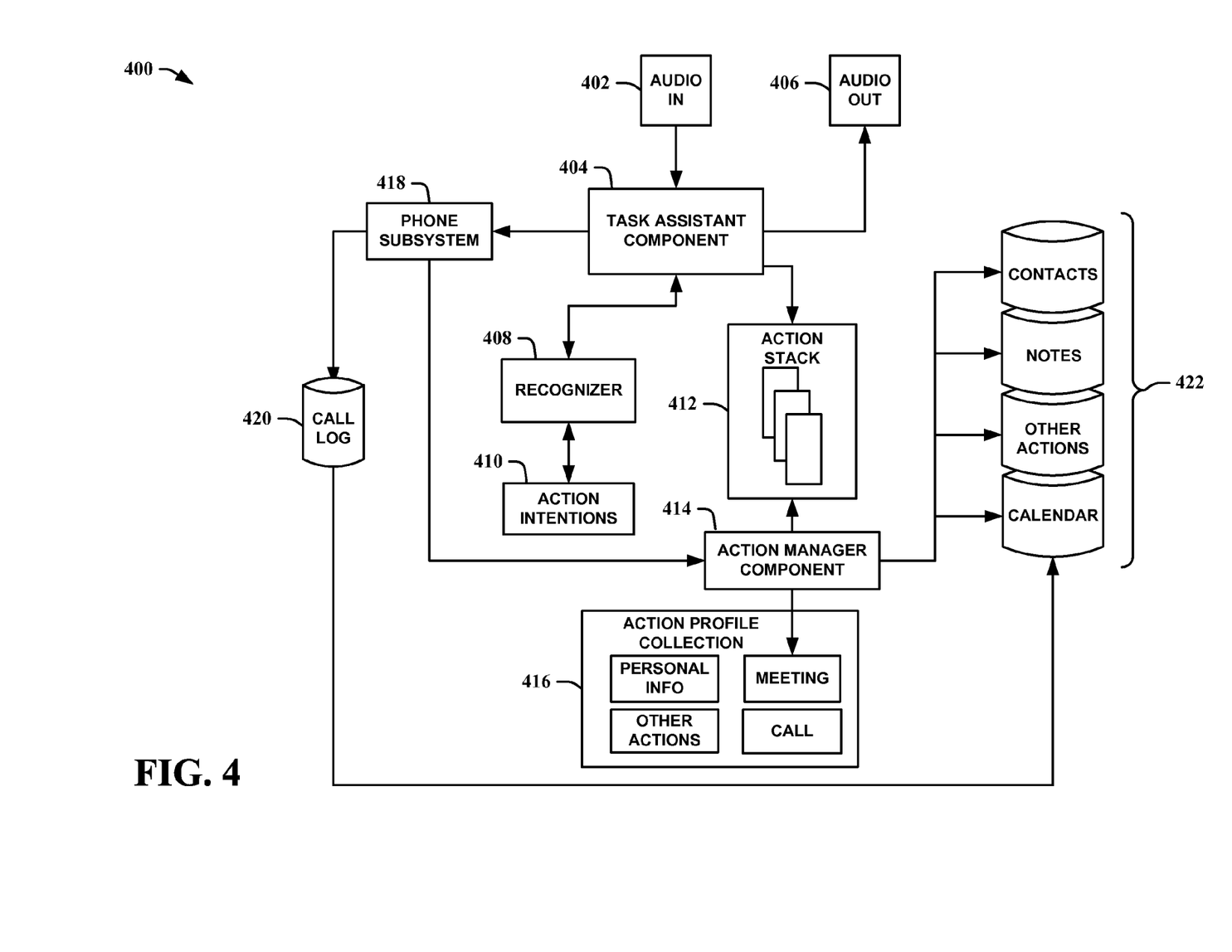
FIG. 4 is an example architecture of a task recognition system for communications in accordance with an aspect of an embodiment.

Referring to FIG. 4, an example architecture 400 of a task recognition system for communications in accordance with an aspect of an embodiment is shown. The architecture 400 illustrates dynamic voice recognition for a device during a telephone call. Follow-up prompting is initiated based on various activities/trigger events. It can be appreciated that although the example architecture 400 illustrates voice-based communications, other types of communications can be utilized as well, including, but not limited to email, instant messaging, and/or text messaging and the like.

Given that communication devices are often used in mobile contexts (transit, walking, between meetings, etc.), it is easy for a user to tell someone on a phone that they will follow-up by scheduling a meeting or some other action and then forget to do so after they hang up. Instances disclosed herein can allow such a communication device to "listen" for the intent of users regarding a mentioned task during their conversation, and after the call completes, prompt for further action based on those task intents. Phrases like "follow-up," "schedule a meeting," "call you tomorrow," etc. can be construed as an intent by a user to actually commit to performing a certain task. For example, if a user was talking to "Bob" and said "I'll follow up on this tomorrow." After the call, the communication device can speak the prompt "Would you like to add a task to follow-up with Bob?" If the user, for example, replies "yes," a task can be added, perhaps containing a reference to the call history with the date and time of the just ended call with Bob.

In the example architecture 400 of an example implementation utilizing voice-based communications, an audio in 402 (from a microphone, headset, etc.) is routed through a task assistant component 404 during a call. The audio stream is forwarded to a regular phone subsystem 418 on a communication device. In this example, the task assistant component 404 employs an external recognizer 408. This allows the task assistant component 404 to utilize existing recognizers and the like without requiring them to be integrated into the task assistant component 404. Thus, the task assistant component 404 channels the audio stream through the recognizer 408 as well. The recognizer 408, in this example, utilizes a set of action intentions 410 to facilitate recognition of a user's intent with regard to a task during in-call recognition.

When an action intent is recognized, a subtle audio cue can be given over an audio out 406 channel to confirm to a user that an action intention has been recognized. Also, when an action intention is recognized, an item is added to the action stack 412 by the task assistant component 404. Typically, upon completion of the call, the call information is written to a call log 420. In this example, a call completion signal is also sent to an action manager component 414 (external to the task assistant component 404) when the call is completed. The action manager component 414, in this example, pulls items from the action stack 412 on a first-in, first-out (FIFO) basis. The action manager component 414 then passes the action item to a profile in an action profile collection 416 corresponding to the current action item (in this example, it is "meeting"). The item artifact is then written to an appropriate store 422 on the communication device based on the appropriate action profile. The action manager component 414 can do additional prompting by voice and/or other means for information needed for the action item. A reference, copy, or link to the call log information can also be added to the action item.

In another instance, upon completion of a call and hang up, the task assistant component 404 actually "calls" a user back. It can be all local to the communication device and, in that case, the phone rings itself and when the user answers, the task assistant component 404 and/or action manager component 414 guides the user through handling some or all of the action items. This experience can be fully verbal and/or a mix of verbal and other interactions.

Figure 5:
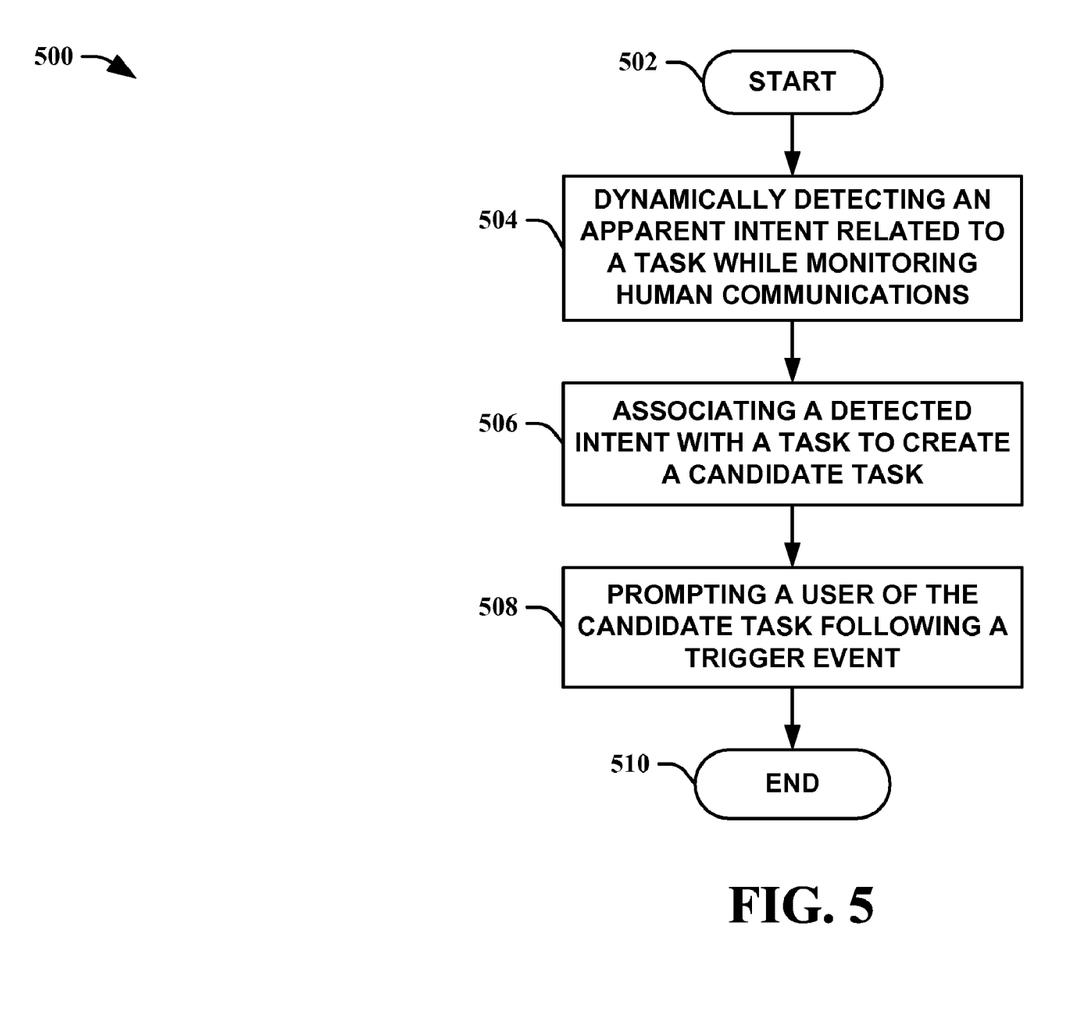
FIG. 5 is a flow diagram of a method of facilitating task recognition in communications in accordance with an aspect of an embodiment.
Figure 6:
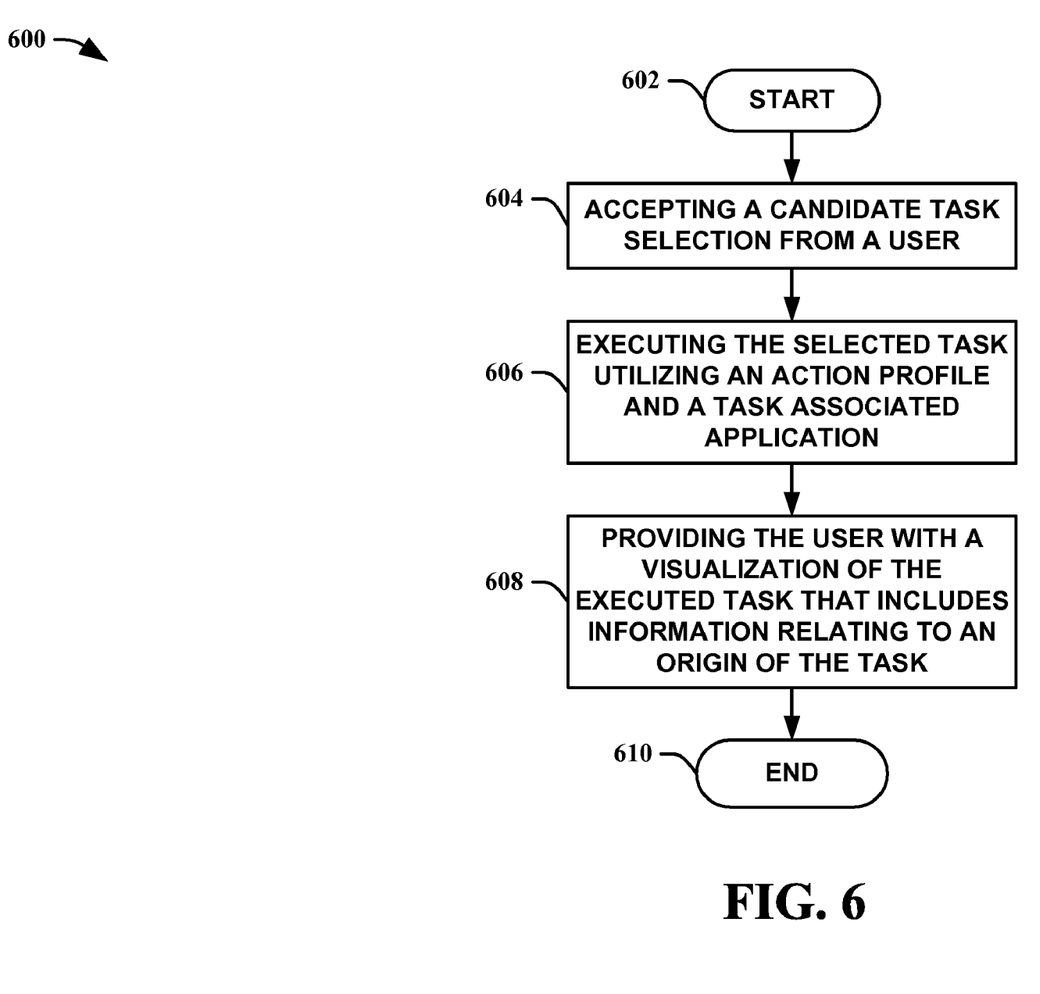
FIG. 6 is another flow diagram of a method of facilitating task recognition in communications in accordance with an aspect of an embodiment.

In view of the exemplary systems shown and described above, methodologies that may be implemented in accordance with the embodiments will be better appreciated with reference to the flow charts of FIGS. 5 and 6. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 5, a flow diagram of a method 500 of facilitating task recognition in communications in accordance with an aspect of an embodiment is shown. The method 500 starts 502 by dynamically detecting an apparent intent related to a task while monitoring human communications 504. The communications can include, but are not limited to, voice communications and/or written communications and the like such as, for example, emailing, instant messaging, text messaging, telephone calls, etc. Contextual and/or environmental information can also be utilized to more accurately determine a user's intent. This typically allows assumptions to be made as to ambiguous references monitored in a communication. A detected intent is then associated with a task to create a candidate task 506. A user intent can require one or more tasks to complete. For example, a user might state "yes, I'll go on the trip with you" and that might require not only an input to a calendar program as a reminder, but also a task to contact a travel agency and/or request tickets, a rental car, and/or a hotel and the like. A user is then prompted of the candidate task following a trigger event 508, ending the flow 510. The trigger event can include, for example, the ending of a communication and/or a particular time of day and the like. A salesperson for example, might make sales calls during the day and prompting with candidate tasks after each call might slow down the sales calls. At the end of the day, the salesperson can then review their tasks at one time. Thus, all ordering tasks can be grouped and/or all support tasks can be grouped and the like. The candidate task grouping can substantially enhance the user's productivity.

Looking at FIG. 6, another flow diagram of a method 600 of facilitating task recognition in communications in accordance with an aspect of an embodiment is depicted. The method 600 starts 602 by accepting a candidate task selection from a user 604. As noted supra, candidate tasks are presented to a user at an appropriate time, giving the user control over what tasks and when and/or how the tasks are completed. The selected task is then executed utilizing an action profile and a task associated application 606. Action profiles can be supplied by third parties such as, for example, the providers of the task associated application and the like.

The action profiles can also be supplied by a user to allow personalization of how and/or when various tasks are performed and the like. The action profiles allow substantial flexibility to be easily incorporated into the process. The user is then provided with a visualization of the executed task that includes information relating to an origin of the task 608, ending the flow 610. For example, a user is presented with a completed calendar entry with a hyperlink linking to when a communication occurred, who the communication was with, and/or the length of the communication. This can assist a user in remembering why the calendar entry was made.

It can be appreciated that although visualization of the executed task is commonly performed, other means of relaying task related information can be employed as well in other instances. These can include, but are not limited to, audible means such as calling a user and indicating when and where a meeting will take place and the like. Likewise, a user can be prompted with a candidate task selection list via a voice call where the user can accept and/or deny various tasks via voice responses and the like.

Figure 7:
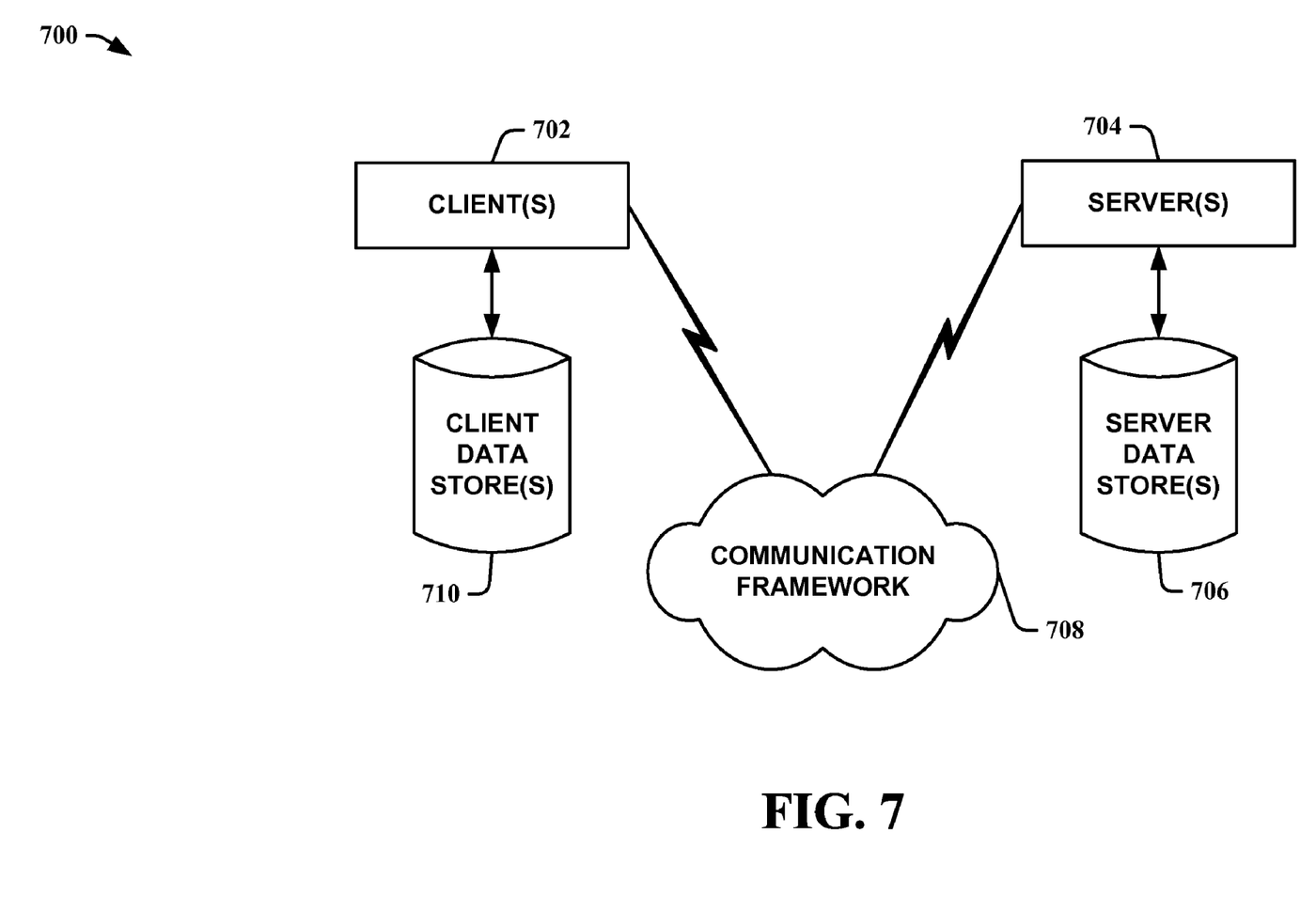
FIG. 7 illustrates an example operating environment in which an embodiment can function.

FIG. 7 is a block diagram of a sample environment 700 with which embodiments can interact. It can be appreciated that various components of instances provided herein can be distributed and utilize such an environment to interact with each other. The system 700 further illustrates a communication means that includes one or more client(s) 702. The client(s) 702 can be hardware and/or software (e.g., threads, processes, computing devices). The system 700 also includes one or more server(s) 704. The server(s) 704 can also be hardware and/or software (e.g., threads, processes, computing devices). One possible communication between a client 702 and a server 704 can be in the form of a data packet adapted to be transmitted between two or more computer processes. The system 700 includes a communication framework 708 that can be employed to facilitate communications between the client(s) 702 and the server(s) 704. The client(s) 702 are connected to one or more client data store(s) 710 that can be employed to store information local to the client(s) 702. Similarly, the server(s) 704 are connected to one or more server data store(s) 706 that can be employed to store information local to the server(s) 704.

It is to be appreciated that the systems and/or methods of the embodiments can be utilized in task recognition facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that responds to human communications, comprising:
   a recognition component that dynamically monitors human communications for an apparent intent related to a task discussed by a user during a communication session with a human second party;
   a task component that receives, at least in part, an apparent intent from the recognition component and associates it with a task to form a candidate task for prompting a user; and
   a computer readable storage medium comprising data structures and sets of codes for causing a computer to execute the recognition and task components.

2. The computer-implemented system of claim 1, the recognition component incorporates environmental or contextual information to facilitate in determining an apparent intent.

3. The computer-implemented system of claim 1, the recognition component employs, at least in part, artificial intelligence processing to detect an apparent intent in the communications.

4. The computer-implemented system of claim 1, the task component stores candidate tasks for recall after a trigger event.

5. The computer-implemented system of claim 1, the task component or recognition component is/are remotely located to a device utilized for the communications.

6. The computer-implemented system of claim 1, the communications comprising audio communications.

7. The computer-implemented system of claim 1 further comprising:
   an action manager component that receives a candidate task directly or indirectly from the task component and prompts a user about the candidate task.

8. The computer-implemented system of claim 7, the action manager component prompts the user after a trigger event.

9. The computer-implemented system of claim 8, the trigger event comprising detection of the apparent intent related to a task and completion of the communications.

10. The computer-implemented system of claim 7, the action manager component interacts with a user to determine which candidate task is performed.

11. The computer-implemented system of claim 10, the action manager component employs an action profile to facilitate in completing a task.

12. The computer-implemented system of claim 10, the action manager component adds a reference, a copy, or a link associated with an originating communication in an application associated with a performed task.

13. The computer-implemented system of claim 10, the action manager component interacts with the user to determine which candidate task is performed by spoken communication.

14. The computer-implemented system of claim 10, the action manager component interacts with the user by prompting with a list of candidate task actions and receiving a user input to select which actions to perform.

15. The computer-implemented system of claim 10, the action manager component interacts with the user by prompting with a candidate task action and guides the user to supply missing information to complete the task action.

16. The computer-implemented system of claim 7, the action manager component is remotely located to a device utilized for the communications.

17. The computer-implemented system of claim 7, the action manager component prompts a user other than participants of the communications.

18. The computer-implemented system of claim 7, the action manager component contacts a user subsequent to a completion of communications via a similar communication means utilized for the communications to prompt for a follow up to the candidate task.

19. The computer-implemented system of claim 1, wherein the recognition component monitors spoken human communications.

20. The computer-implemented system of claim 19, wherein the recognition component monitors wireless communication of a mobile device used by the user for spoken human communications.

21. The computer-implemented system of claim 20, further comprising an action manager component that receives a candidate task and prompts the user about the candidate task after completion of the communication session by calling back the user on the mobile device.

22. The computer-implemented system of claim 20, wherein the action manager resides on service provider network in wireless communication with the mobile device.

23. The computer-implemented system of claim 1, wherein the recognition component monitors textual human communications.

24. The computer-implemented system of claim 1, further comprising the recognition component that dynamically monitors human communications for the apparent intent of a sales transaction task and the task component that associates the second party with the sales transaction task.

25. The computer-implemented system of claim 1, further comprising the recognition component that dynamically monitors human communications for the apparent intent of a trip task and the task component that associates the trip task with a calendar input and prompts for associated travel and lodging tasks.

26. The computer-implemented system of claim 1, further comprising the recognition component for performing phrase recognition to determining apparent intent.

27. The computer-implemented system of claim 26, further comprising the recognition component for utilizing contextual or environmental information to assist in determining meaning of the human communications comprising time of day, day of week, and device used by the user to perform the human communications.

28. The computer-implemented system of claim 1, further comprising the recognition component for excluding a candidate task action based upon a response from the human second party.

29. The computer-implemented system of claim 1, the communications comprising visual communications.

30. The computer-implemented system of claim 1, the communications comprising written communications.

31. A computer-implemented method for extracting tasks from communications, comprising:
dynamically detecting an apparent intent related to a task while monitoring human communications by a user during a communication session with a human second party;
associating a detected intent with a task to create a candidate task; and
prompting a user of the candidate task following a trigger event.

32. The computer-implemented method of claim 31 further comprising:
accepting a candidate task selection from the user;
executing the selected task utilizing an action profile and a task associated application; and
providing the user with a visualization of the executed task that includes information relating to an origin of the task.

33. The computer-implemented method of claim 31 further comprising:
employing environmental or contextual information to facilitate in determining an apparent intent.

34. The method of claim 33, further comprising:
dynamically detecting an apparent intent related to a task while monitoring a human communication session between a user and a second party over a communication network by performing phrase recognition of spoken or textual content, the dynamic detecting assisted by the contextual or environmental information of time of day, day of the week, and device used by the user for the human communication session;
prompting the user with the candidate task following the trigger event of termination of the communication session for confirmation of a candidate task associated with the detected intent; and
storing a confirmed task referenced to context of the human communication session in a computer-readable storage medium for execution by an application on a computer for the user.

35. The computer-implemented method of claim 31, the communications comprising emails, instant messaging, text messaging, or voice communications.

36. A computer-implemented system that is responsive to human communications, comprising:
means for dynamically extracting an apparent intent related to a task from visual or aural communications discussed by a user during a communication session with a human second party;
means for associating the extracted apparent intent to an existing task to create a candidate task;
means for interacting with the user to indicate that a candidate task was obtained from the communications and to allow user selections of candidate tasks for execution; and
a computer readable storage medium comprising data structures and sets of codes for causing a computer to execute the recognition and task components.

* * * * *